United States Patent [19]

Knothe et al.

[11] Patent Number: 4,512,007
[45] Date of Patent: Apr. 16, 1985

[54] METHOD FOR PRODUCING A RECORD CARRIER

[75] Inventors: Herbert Knothe, Neumünster; Klaus Röschmann, Schülp, both of Fed. Rep. of Germany

[73] Assignee: Teldec Telefunken-Decca-Schallplatten GmbH, Hamburg, Fed. Rep. of Germany

[21] Appl. No.: 366,395

[22] Filed: Apr. 7, 1982

[30] Foreign Application Priority Data

Apr. 8, 1981 [DE] Fed. Rep. of Germany ....... 3114131

[51] Int. Cl.³ .......................... G11B 3/00; C25D 5/48
[52] U.S. Cl. ........................................ 369/127; 204/5; 204/35.1; 204/52 R; 369/153; 369/283
[58] Field of Search ....................... 369/127, 283, 153; 204/5, 35 R, 52 R

[56] References Cited

U.S. PATENT DOCUMENTS

| | | | |
|---|---|---|---|
| 4,038,161 | 7/1977 | Eckles et al. | 204/52 R |
| 4,248,438 | 2/1981 | Knothe et al. | 369/127 |

FOREIGN PATENT DOCUMENTS

| | | |
|---|---|---|
| 1496772 | 4/1971 | Fed. Rep. of Germany . |
| 2811888 | 11/1980 | Fed. Rep. of Germany . |

Primary Examiner—G. L. Kaplan
Assistant Examiner—William T. Leader
Attorney, Agent, or Firm—Spencer & Frank

[57] ABSTRACT

Process for manufacturing a record carrier having a cuttable copper layer, wherein a copper layer is precipitated onto a substrate in an electrochemical bath and a desired Vickers hardness in the precipitated copper layer is obtained by controlling the concentration of brightener additives. The copper layer is precipitated in a recrystallizable phase, and the recording is cut while the copper layer is in its recrystallizable phase.

2 Claims, 1 Drawing Figure

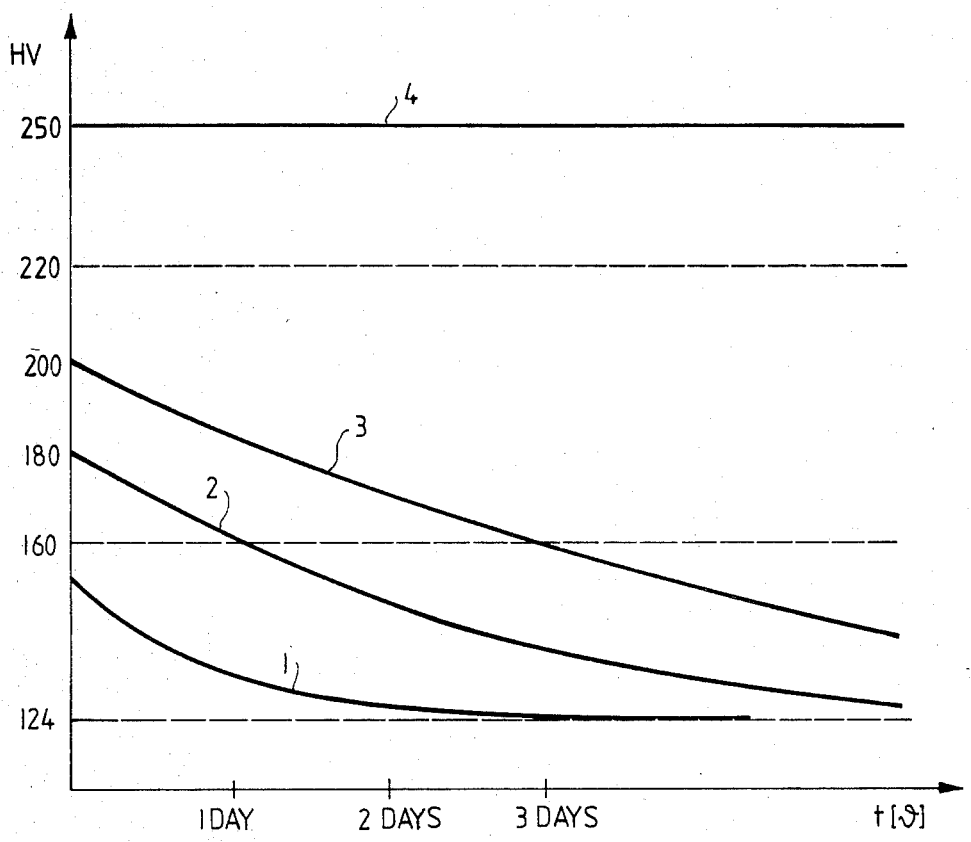

METHOD FOR PRODUCING A RECORD CARRIER

BACKGROUND OF THE INVENTION

The present invention relates to a method for producing a record carrier, and more particularly for producing a record carrier which can be used for the production of phonograph records.

German Pat. No. 2,811,888 and corresponding U.S. Pat. No. 4,248,438 to Knothe et al. disclose a method for producing a metal matrix provided with a groove modulation. In the process disclosed in these patents, a thin layer of copper is initially electrochemically deposited from a copper bath onto a substrate. The groove modulation is then cut into the copper layer electromechanically by means of a cutting stylus which is guided over the metal matrix. The electrochemical bath contains brightener additives which impart a Vickers hardness between 110 and 300 to the copper layer. When cutting the groove modulation, the cutting stylus is guided over the metal matrix at an angle between 10° and 20°.

In this prior art process, a cuttable layer of copper is precipitated which is suitable for the production of video recordings, but which does not satisfy the demands for the production of phonograph records made with an analogous cut with a much greater modulation depth. The use of the known teachings disclosed in the above patents leads to the precipitation of a copper layer which is not suited for cutting sound recordings. Due to the much greater cutting depth for analog sound recordings than for digital or frequency modulated video recordings, the copper presents a much greater resistance to the cutting stylus.

In the conventional technology for producing phonograph records, a cuttable layer of nitrocellulose is applied onto a substrate of, e.g., aluminum and the modulation is cut into this nitrocellulose layer. Compared to a cuttable copper layer, a lacquer layer is much softer and presents a much lower resistance to the cutting stylus. The quality of a lacquer recording is limited, however, because it experiences system-caused errors, such as leading and trailing echoes.

SUMMARY OF THE INVENTION

It is an object of the present invention to provide a process for producing a record carrier having a cuttable layer of copper.

A further object of the present invention is to produce such a record carrier which is capable of being used for sound recordings as well as video recordings, and which is of improved quality compared to a conventional lacquer recording.

To achieve the foregoing objects and in accordance with its purpose, the present invention provides a process for manufacturing a record carrier having a cuttable copper layer, wherein a copper layer is precipitated onto a substrate in an electrochemical bath, and a desired Vickers hardness in the precipitated copper layer is obtained by controlling the concentration of a brightener additive in the bath, comprising precipitating the copper layer in a recrystallizable phase, and cutting the recording while the copper layer is in its recrystallizable phase.

It is to be understood that both the foregoing general description and the following detailed description are exemplary, but are not restrictive of the invention.

BRIEF DESCRIPTION OF THE DRAWINGS

The sole drawing FIGURE shows curves of Vickers hardness vs. time for various copper layers precipitates from electrochemical bath.

DETAILED DESCRIPTION OF THE INVENTION

The process according to the invention is based on precipitating onto a substrate in an electrochemical bath a copper layer which is recrystallizable and is thus in an unstable phase, and then cutting the recording while the copper layer is in its recrystallizable phase. The precipitation of a recrystallizable copper layer is achieved by controlling certain process variables in relation to one another. Specifically, the concentration of the copper ions in the electrochemical bath, the concentration of brightener in the electrochemical bath, the convection of the electrochemical bath, and the current density in the bath are dimensioned and adapted to one another to produce a recrystallizable copper layer.

According to Vickers hardness, the range of crystallizability of copper extends from about 160 to 220 kg/mm$^2$. The process according to the present invention precipitates a copper layer having a Vickers hardness in the 160 to 220 kg/mm$^2$ range, and which simultaneously exhibits ductility and elasticity which are prerequisites for good recording behavior. Copper which is in a recrystallizable phase will crystallize over a period of time, as evidenced, for example, by a reduction in Vickers hardness to below 160. In accordance with the present invention, the record carrier must be cut while the copper is still recrystallizable. Thus the copper layer is cut while the copper has a Vickers hardness of 160 to 220 kg/mm$^2$. Preferably, the copper layer is cut during the time in which the Vickers hardness of the precipitated copper in the recrystallization phase is 160 to 220 kg/mm$^2$.

It has been found that compared to a conventional lacquer recording, the number of rejects can be reduced considerably when the process according to the present invention is employed to produce a record carrier. The quality of the recordings is improved, and particularly the signal to noise ratio can be improved by about 10 dB in the record carriers produced according to the present invention. No bubbles, air inclusions, shrink-holes or distortions exist in the record carriers produced according to the present invention.

Record carriers produced by the process according to the present invention do not experience any leading or trailing echoes which are unavoidable in the conventional lacquer recordings. By employing the process according to the present invention, no complicated silverplating is required in the production of subsequent items. The cut record carrier can be stored for an unlimited time, and further copies can be made at any time. All copies subsequent in time have the same, unchanging quality as the first copy.

Turning now to the drawing, there is shown hardness versus time curves for a number of cuttable layers which were produced according to the process of the present invention, as well as hardness versus time curves for a number of copper layers which were not produced according to the process of the present invention.

In the drawing, the time is plotted on the horizontal axis, and the Vickers hardness is plotted on the vertical axis. The starting point of the time axis corresponds to the end of the manufacturing time (precipitating time). Depending on the bath composition and the bath conditions for the electrolyte for precipitating the cuttable layer on the record carrier, the starting value of the resulting Vickers hardness will differ.

Four different hardness curves are shown which begin with different initial hardness values. Curve 1 shows the hardness versus time of a copper layer which was not produced according to the present invention and which was precipitated with an initial hardness value of about 150. Curves 2 and 3 show the hardness versus time of two cuttable layers which were produced according to the present invention and show initial hardness values of about 180 and 200, respectively. Curve 4 shows the hardness curve versus time of a copper layer which was not produced in accordance with the present invention. It can be seen that curves 1, 2, and 3, although they begin with different initial values, drop to the final value of 124 after a certain period of time. Only curve 4 shows no drop, but remains approximately constant at hardness 250. The degree of drop in curves 1, 2, and 3, i.e., its rate of descent, depends directly on the temperature. The higher the ambient temperature, the faster is the drop in hardness. At a temperature of 100° C., a record carrier produced according to the first step of the process of the present invention, that is a record carrier which has been formed with a copper layer which is recrystallizable, is no longer usable for cutting a sound recording already after one hour because the copper has then recrystallized and its Vickers hardness has fallen below 160.

The drop in hardness of the precipitated copper decreases with increasing initial hardness. For hardnesses above 250 HV hardly any drop in hardness can be noted at room temperature. With decreasing initial hardness, the drop in hardness becomes greater in dependence on temperature and reaches its final value at about 124 HV. This drop in hardness is a result of recrystallization. This recrystallization involves a molecular movement in the structure which is accelerated by the temperature.

It can be seen in the drawing that curve 2 begins at approximately a hardness value of 180 and has reached the hardness value of 160 already after 1 day. Below this 160 hardness value, cutting is no longer possible in accordance with the present invention due to the softness of copper.

With an initial hardness value of about 200, it takes about three days, at normal temperature, until the lower value of 160 is reached. However, with such a high initial value, cuttability was already worse than with an initial value of 180. Precipitation in accordance with the present invention should therefore preferably take place at the lowest possible hardness value, just above the lower hardness value of 160, but then the time available for making the recording by cutting after precipitation of the copper is relatively short. It is therefore recommended to store the record carrier at the lowest possible temperature until the record is cut so as to extend the time at which recrystallization takes place and to lengthen the period during which the hardness drops to the lower useable limit value of 160.

The curves shown in the drawing were obtained by maintaining the record carriers with their copper layers at a storage temperature of about 20° C. These curves were obtained in practice with the following bath composition and conditions:

| Curve 2 (initial hardness 180 HV) | |
|---|---|
| copper sulfate | 240 g/liter of bath volume |
| sulfuric acid | 70 g/liter of bath volume |
| chlorine ions | 70 mg/liter of bath volume |
| wetting agent | 5 ml/liter of bath volume |
| brightener | 0.5 ml/liter of bath volume |
| leveling agent (smoother) | 80 mg/liter of bath volume |
| current density | 12 A/dm$^2$ |
| rate of rotation | 16 rpm |
| air throughput | 2.5.1(air)/min. liter of bath volume |
| Curve 3 (initial hardness 200 HV) | |
| copper sulfate | 240 g/liter of bath volume |
| sulfuric acid | 70 g/liter of bath volume |
| chlorine ions | 70 mg/liter of bath volume |
| wetting agent | 5 ml/liter of bath volume |
| brightener | 0.7 ml/liter of bath volume |
| leveling agent (smoother) | 100 mg/liter of bath volume |
| current density | 12 A/dm$^2$ |
| rate of rotation | 16 rpm |
| air throughput | 2.5 l(air)/min. liter of bath volume |

Curve 1 is a hardness curve with an initial hardness value of 150 HV which represents a noncuttable copper. This curve was obtained by values of only 0.2 ml/l brightener, 300 g/l copper sulfate, a high current density of 15 A/dm$^2$ and low convection.

Curve 4 also is a hardness curve indicating a hardness of 250 HV which does not change over time. This was attained by values of 0.8 ml/l brightener, 150 g/l copper sulfate, a current density of only 2 A/dm$^2$ and high convection. The bath composition and conditions used to produce curve 4 are also not suitable for the production of a cuttable copper in accordance with the present invention.

The bath compositions and conditions used for curves 2 and 3 lead, after about ½ hour, to an electrochemical deposition on a substrate, e.g. aluminum, at a layer thickness of about 80μ which is sufficient for an audio recording with a cut groove of a maximum depth of 70μ. The deposition can be conducted at room temperature and can continue, for example, for one hour.

The brightener employed in the practice of the present invention can be a known brightener, for example, as known from German Pat. No. 1,146,322 which is hereby incorporated by reference. Such a brightener comprises organic sulfonic acids or their salts which in their molecules have at least one thiourea radical and at least one dithiocarbamine acid radical or at least one aryl radical or whose sulfonic acid radical is bound, in the form of an alkyl sulfone, through the sulfur atom of the thiourea radical.

A suitable leveling agent (smoother substance) which is well suited for the purposes of the present invention is disclosed in German Patent No. 1,496,772, which is hereby incorporated by reference. The leveling agent generally is in the form of a powder and has the general formula:

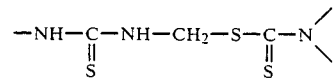

with the free valences of the nitrogen atoms possibly being bound to aliphatic, cycloaliphatic or aromatic radicals or hydrogen, the free valences of the nitrogen atom of the dithiocarbamine acid radical together with the nitrogen may also form a hetero ring system, and the free valence of the nitrogen atom of the thiourea radical may also be bound to a further dithiocarbamine acid—S—methyl radical according to the above formula.

To prevent pore formation in the copper layer, it is of advantage to use a wetting agent. The wetting agent composition disclosed in German Pat. No. 1,496,772 is well suited for this purpose. In particular, the wetting agent can be an additive product of 8 Mol ethylene oxide and 1 Mol dodecyl alcohol. A low-foam wetting agent should be employed so that no foaming-over occurs during the convection of the bath.

A brightener additive system containing brightener 67, a leveling agent M5 powder, and a wetting agent can be obtained from the firm Henkel.

The parameters employed within the range limits disclosed below result in a copper layer sufficient for the purposes of the present invention.

| Copper sulfate | 150–300 g/liter of bath volume, preferably 210 to 240 g/l |
| --- | --- |
| sulfuric acid | 20–100 g/liter of bath volume, preferably 60 to 70 g/l |
| chlorine ions | 40–120 mg/liter of bath volume, preferably 70 to 100 mg/l |
| wetting agent | 1–20 ml/liter of bath volume, preferably about 5 ml/l |
| brightener | 0.2–0.8 ml/liter of bath volume, preferably 0.5 ml/l |
| leveling agent (smoother) | 50–100 mg/liter of bath volume, preferably 80 to 100 mg/l |
| current density | 1–12 A/dm$^2$, preferably 8 to 12 A/dm$^2$ |
| rate of rotation | 10–60 rpm |
| air throughput | 0–10 l(air)/min. liter of bath volume. |

The cuttability of copper is significantly influenced by the following bath parameters:
(a) copper ion concentration;
(b) brightener concentration;
(c) convection;
(d) current density.

With a low copper ion concentration, the amount of brightener added can also be reduced because with the same current density the ratio of brightener to copper ions likewise changes in the cathode film. The higher the copper content, the more brightener must be present to keep the ratio uniform (constant) in the precipitate. The quantity of brightener added is a decisive factor for recrystallizability. Copper with a saturated brightener concentration in the precipitate cannot recrystallize, and such copper precipitates do not exhibit good recording characteristics. Preferably, the brightener is present in the bath in an amount of 0.2 ml/liter of bath volume to 0.8 ml/liter of bath volume.

The chlorine ions which are present in the bath are added in the form of hydrochloric acid. Sodium chloride can also be used, however.

The more the electrolyte is moved, the more fresh quantities of electrolyte are replenished in the cathode film. Good convection of the bath is therefore a necessity.

Convection can be produced advantageously by rotating the record carrier or the cathode at a rate of rotation of about 10 to 60 rpm or by intensive circulation of the electrolyte, or also by blowing in air, which should be free of oil in particular. The rotary movement, blowing in of air or intensive movement of the electrolyte assures that copper ions and brightener are continuously replenished at the substrate. Blowing in air additionally avoids convection traces. Thus, a smooth surface is produced which is sufficient for the recording.

Moreover, the current density is a deciding factor for the precipitation of cuttable copper in accordance with the present invention. With decreasing current density the precipitated copper layer becomes harder. When the current density is less than 1 A/dm$^2$, hardness values of 250 and more are realized. However, such copper layers can not be cut. The above stated compositions and bath conditions as used to produce curves 2 and 3 result in a cuttable copper having an initial hardness of about 180 to 200.

Thus, current density and convection, in addition to the content of brightener and copper ions, are of great significance for the hardness development.

Low brightener content, high current density, low convection and high copper sulfate content lead to a copper having a low initial hardness. Conversely, high brightener content, low copper sulfate content, low current density and intensive convection lead to a copper having a high initial hardness. In the present invention, these variables are controlled in relation to each other to produce a copper having an initial hardness in the recrystallizable range.

The substrate for the record carrier must be a high quality carrier material, such as, for example, an aluminum plate. It should be free of sinkholes and, since all surface roughnesses are reproduced through the copper film, it should have a planar, smooth surface quality. If required, the substrate can be subjected to a suitable surface treatment, such as polishing to provide a smooth surface quality. Slight surface flaws are reduced or even completely smoothed by the leveling agent (smoother) which is present in the electrolyte.

It will be understood that the above description of the present invention is susceptible to various modifications, changes and adaptations, and the same are intended to be comprehended within the meaning and range of equivalents of the appended claims.

What is claimed is:

1. Process for manufacturing a record carrier having a cuttable copper layer, wherein a copper layer is precipitated onto a substrate in an electrochemical bath containing copper ions and a brightener additive and a Vickers hardness ranging from about 160 to about 220 kg/mm$^2$ in the precipitated copper layer is obtained by controlling the concentration of the brightener additive, comprising: precipitating the copper layer in a recrystallizable phase, and cutting the recording while the copper layer is in its recrystallizable phase, with the temperature of the bath being held at room temperature and the record carrier being kept at a temperature below room temperature until the recording is cut to prolong the time during which recrystallization occurs.

2. Process for manufacturing a record carrier having a cuttable copper layer, wherein a copper layer is precipitated onto a substrate in an electrochemical bath containing copper ions and a brightener additive and a Vickers hardness ranging from about 160 to about 220 kg/mm$^2$ in the precipitated copper layer is obtained by controlling the concentration of the brightener additive, comprising: precipitating the copper layer in a recrystallizable phase; cutting the recording while the copper layer is in its recrystallizable phase; and maintaining the copper layer at a temperature below room temperature for at least part of the time between the precipitating and cutting steps.

* * * * *